Dec. 24, 1940.                 J. W. GILLON                 2,226,167
                              EXPOSURE TABLET
                            Filed Nov. 30, 1939
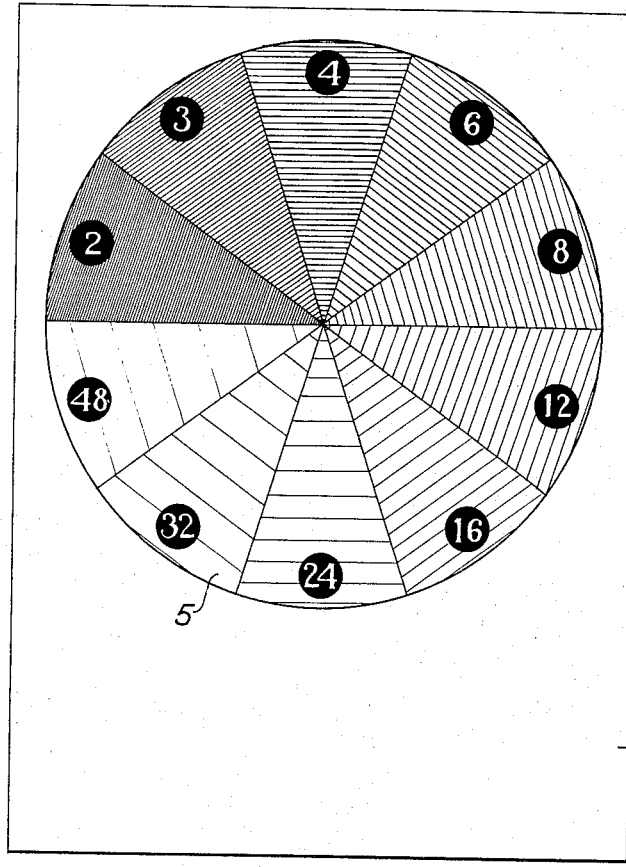
JOHN WARREN GILLON
INVENTOR
BY
ATTORNEYS Patented Dec. 24, 1940

2,226,167

UNITED STATES PATENT OFFICE 2,226,167

EXPOSURE TABLET

John Warren Gillon, Rochester, N. Y., assignor to Eastman Kodak Company, Rochester, N. Y., a corporation of New Jersey Application November 30, 1939, Serial No. 306,873

2 Claims. (Cl. 88—14)

The present invention relates to photography, and particularly to an exposure tablet having areas of different density for use in making photographic prints from a negative.

In the process of making photographic prints, two problems which always confront the photographer, and which are more difficult for the amateur to solve than the professional, include, the choice of a proper exposure to give the negative, and the choice of a sensitive paper having the proper grade of contrast to give the best results with the particular negative being printed.

A common method practiced for determining the correct exposure comprises making a series of different exposures onto separate sheets of printing paper, or onto adjacent portions of the same sheet of paper, giving the separate exposed areas the same development, and then comparing the resulting prints, relying upon the eye to determine by comparison the best resulting prints and then proceeding with the exposure which gives the print having the desired photographic quality. It need not be specifically pointed out why this method of determining the proper exposure is unsatisfactory. It will suffice to say that it is wasteful of material, requires an excessive amount of time; and in addition it has been found that a photographer, particularly an amateur, cannot by comparing prints made on separate sheets of paper with different exposures accurately determine the print having the best photographic quality, particularly when the comparison is restricted to a few prints having exposures which differ by a small magnitude.

This problem of determining the correct exposure time to give photographic prints has been lessened to some extent by the provision of exposure tablets having sections of different light permeability, or density, for printing from negatives onto photographic printing paper. The exposure tablets based on this principle are utilized by having the light used for printing a proof, or trial, strip exposed through sections of different and gradually varying density. These sections form part of the exposure tablet which is placed between the negative and the paper. The density of each section of the exposure tablet is previously tested and known to the operator. The trial strip of paper is then developed and the section thereof which appears the best is selected. Since the density of each section is known, this enables the operator to determine how and to what extent the time of exposure chosen for the trial strip should be modified to secure the best results when a print is made from the entire negative.

While exposure tablets of the type above described are a definite advance step in the determination of printing exposures, they have been frequently found to be unreliable and difficult to use for several reasons. When making prints from a negative, I have found that there is generally a given center of interest on the negative which it is desired to bring out most of all in the print. It is, therefore, the aim of the photographer to choose an exposure which will be best suited for bringing out the given center of interest to the best advantage. As is very often the case, the center of interest of a negative may be a rather limited area, and in order to be able to use an exposure tablet of the type described it is necessary that an image of the center of interest be projected through each of the sections on the tablet simultaneously. In the exposure tablets of the prior art the sections of different density are usually rectangular in shape and arranged side by side so as to cover the entire, or substantially the entire, negative. With such an arrangement of density sections it is impossible to locate the tablet so that a given center of interest of the negative will be projected through all of the sections simultaneously, and particularly if the center of interest is a restricted area. In fact, the density sections of exposure tablets in the prior art have purposely been arranged in a spaced relation which would defeat their use relative to a restricted center of interest, the theory of their use being different from that which I have found desirable and to give the best results. In addition, these known exposure tablets have density sections the value of which was known relative to an area of zero density, but in order to determine the proper exposure necessary in making a print the operator has to remember which section gave the proper exposure, then modify the given exposure in accordance with the density of the section giving said proper exposure. It is often the case that the operator forgets the density value of the respective sections, or gets them mixed up in his calculations of the desired exposure, with the result that the final exposure is not what he wants at all, whether or not he appreciates the fact when he is through.

None of the exposure tablets of the prior art have been designed to aid the operator in selecting the sensitive printing paper having the proper grade of contrast for the particular negative he is working with, and so far as I am aware, there is no teaching in the prior art that the correct choice of grade of contrast of a printing paper can be determined by the use of such an exposure tablet, or by the principle involved in the use thereof.

Therefore, one object of the present invention is to provide an exposure tablet of the type described wherein the sections of different densities are so arranged relative to one another that a restricted area of a negative can be projected through each section simultaneously. And a further object is to make said density sections sector shaped and arrange them in substantially abutting relation with the apex of each emanating from a single point, whereby a portion of all of the sections is adapted to extend into a common restricted area. And yet another object is to make each of said sections of a known density having a definite known relation to a given exposure, and the density of each section different fro meach other. And a further object is to mark each of said sections with an index which indicates the exposure equivalent to said sections directly with relation to a given exposure, and to place said indicia on their respective sections so that they will appear on the trial printing paper in conjunction with the sections to which they relate upon development of the paper. And yet another object is to arrange the several sections so that any one section will be abutted on one side by a section having a density one step greater than said section, and will be abutted on the other side by a section having a density one step less than said section, with the result that the density of the sections around the tablet in a given direction will increase or decrease in regular increments whereby the operator will be able to determine from the print made through said tablet upon development whether or not printing paper of the correct grade of contrast for the particular negative is being used.

The novel features that I consider characteristic of my invention are set forth with particularity in the appended claims. The invention itself, however, both as to its construction and use, together with additional objects and advantages thereof, will best be understood from the following description of a specific embodiment when read in connection with the accompanying drawing in which, The single figure is a plan view of an exposure tablet constructed in accordance with a preferred embodiment of the present invention.

The exposure tablet constructed in accordance with the present invention comprises a support I which may comprise a piece of transparent material such as glass, a sheet of transparent cellulosic material, or the like. I have found that a heavy grade of transparent cellulosic sheet material is preferable over glass for the reason that it is flexible, light, and not subject to fracture from shock. A plurality of sector-shaped sections 5 of different light permeability, or density, are arranged on the support to form a circle. The sections 5 are shaped and arranged in the manner shown so that a portion of each will extend into a given restricted area (around their point of intersection), through which a restricted center of interest on a given negative can be projected onto a sensitive printing paper, whereby a given exposure through said center of interest will be altered in accordance with the density of each of said sections simultaneously. It will be readily understood that a print of a negative will be made through the exposure tablet onto a trial sheet of printing paper with a given time of exposure, and when the paper is developed the print will show areas corresponding to the several sections having been given different exposures in accordance with the density of the different sections of the exposure tablet. Since these printed areas are closely adjacent to one another, and will all include substantially the same restricted area on the negative the operator has no difficulty in choosing the exposure giving the most satisfactory results.

Each of the sections 5 is made to have a density which will cut down a given exposure made therethrough to a fraction of said given exposure, and each of said sections is adapted to have a density different from the density of the remaining sections. I have found that a one-minute exposure will generally be in excess of that required for the most contrasty negative usually encountered, so that I have calculated the densities of the several sections of the tablet in proportion to a given exposure time of one-minute, or 60 seconds. The section bearing the index 4, therefore, will be made to have a density which will cut out enough of the printing light to give a resultant exposure equivalent to four seconds. In like manner the densities of the other sections will be such as to give equivalent exposures of 6, 8, 12, etc., seconds when the image of the center of interest of the negative is projected through the section for the set exposure of one minute. It will thus be seen that the indicia on the several sections give the exposure made through the same directly in seconds so that no calculation is necessary. For instance, if the exposure tablet is placed between the trial printing paper and the negative and the given exposure of one minute is given, on development the print will show areas exposed differently and in accordance with the sections. Now when a suitable printed area is chosen, the section through which said area was projected is noticed, and if it bears the index 4, then 4 seconds is the exposure which will give a print having the desired photographic quality. It will be readily appreciated by those skilled in the art that if a one-minute exposure is found to be too short for a given negative, then the exposure could be doubled, or made two minutes, whereupon the indicia of the several sections would have to be doubled to obtain the exposures equivalent thereto.

So that the indicia of the several sections will appear on the areas printed therethrough the indicia are made transparent and encircled by an opaque area. This arrangement will insure the indicia appearing clearly on the printed areas after development whereby the exposure time given any one of said areas can be read directly from the printed area itself. This eliminates the necessity of having to compare a given printed area with the section of the exposure tablet controlling its exposure and then reading the exposure time from an index on said section, which procedure would introduce a chance for error due to the fact that a chosen printed area might be linked up with the wrong section of the exposure tablet. It is pointed out that the indicia need not be transparent and encircled by an opaque area as shown, but the indicia would appear clearly upon the printed areas of the trial sheet of printing paper if the density of said indicia were made different from the density of the sections to which they related.

I have found that by arranging the sections 5 relative to one another so that the density increases or decreases in regular intervals in one direction around the tablet that the exposure tablet will give an indication as to whether printing paper of the correct grade of contrast for a particular negative is being used. It will be noted that such an arrangement is carried out in the exposure tablet shown in the drawing. Starting with the section bearing the index 2, which section in the present instance, is the most dense of the group, and moving in a clockwise direction therefrom, it will be noted that the sections are arranged relative to one another so that the density increases in successive steps until the section bearing the index 48 is reached, which section has the least density of the group.

I have found that due to this particular arrangement a trial print made through the exposure tablet will give an accurate indication as to whether or not the proper grade of contrast and printing paper for a particular negative is being used. If the printing areas on the trial paper after development show the areas at one end of the scale printed decidedly light, and the printed areas at the other end of the scale printed decidedly dark, and also show a sharp contrast in photographic quality between successive printed areas, then it can be deduced that a paper having too much contrast is being used. If the majority of the several printed areas are decidedly light, and there is no appreciable contrast between successive areas, then this is an indication that the printing paper being used is of too soft a grade. On the other hand, if all of the printed areas show a decided contrast relative to one another and graduate from an image having a light photographic quality to an image having a very dark photographic quality, then it can be assumed that the proper grade of printing paper is being used.

The adaptability of an exposure tablet having the prescribed arrangement of density sections for indicating the contrast of the printing paper being used is believed to be based on the known principle that the change in density for a given range of exposures varies with each grade of contrast of a given printing paper. For instance, if the change in density is plotted against the change in exposure over a given range for a certain grade of contrast of a given printing paper the slope of such a curve will be found to vary with respect to a similar curve showing the characteristics of a different grade of contrast of the same printing paper. This principle is well known to those skilled in the art and is published in photographic data literature pertaining to photographic papers, e. g. the data book on photographic papers entitled, "Eastman Photographic Papers," complied and sold by the Eastman Kodak Company; and since this principle is so well known and a knowledge of the same can be obtained from the noted publication, it is not deemed necessary to elaborate on the same in this specification. Correlating the above-mentioned principle of photographic papers with the use of the disclosed exposure tablet, it will be appreciated that exposing a given grade of contrast of printing paper through the exposure tablet is the equivalent of giving the paper a different range of exposures. The different photographic quality of the several developed printed areas will vary as, and give an indication of, the change in density of the paper resulting from the several different exposures, whereby the visual contrast in the successive areas when compared with one another will give a visual representation of a curve based on change of density over a given exposure range for a grade of contrast of printing paper being used.

It will be appreciated that in order to be able to obtain an accurate visual representation of a curve of this type the sections must be arranged so that the density around the tablet in one direction changes in successive steps. For instance, if the section bearing the index 32 as placed adjacent the section bearing the index 2 and was followed by the section marked 4, etc., it will be appreciated that it would be next to impossible to compare printed areas made therethrough to form a visual representation of a curve indicating the relation of change in density for a given range of exposures. Therefore, since it is necessary in determining whether a correct grade of contrast of printing paper is being used to compare the changes in photographic quality of successive printed areas, it will be readily understood that the sections of the exposure tablet must be arranged so that the density of the sections increase successively in one direction around the tablet.

An exposure tablet of the type described can be produced in any suitable manner, such for example as by attaching separate sections having the desired density to a support in the arrangement disclosed. However, one easy and rapid manner of producing an exposure tablet of this type which I have found desirable comprises coating the transparent support with a sensitive photographic emulsion and making a print of a master exposure tablet onto said support. After development of the support, the exposure tablet will appear thereon as an integral part of the support itself. The densities of the sections on the master exposure tablet can be produced sensitometrically to have the desired known density values, and the printing and development of subsequent tablets made from the master tablet can be sensitometrically controlled to insure an exact reproduction of the density sections.

By making the different sections 5 of the exposure table in the form of sectors which can be arranged in the shape of a disk or circle, an exposure tablet is provided whereby all of the sections may be located over a restricted area of interest on a given negative and a given exposure made through all of said sections simultaneously. In addition, this particular arrangement of sections affords a ready and accurate comparison of the printed areas made through said sections for the purpose of choosing the correct grade of contrast of printing paper suitable for a given negative. The fact that the densities of the several sections bear a definite relation to a given exposure so as to give a secondary exposure equal to a fractional part of a given exposure, and indexing said sections to give the secondary exposure directly, expediates, and reduces the chance of error in, the use of such exposure tablets of this general type found in the prior art. Placing the indicia on the several sections so that they are printed directly onto the printing paper in the section to which they refer further expediates the use of this exposure tablet. While I have shown the several sections 5 arranged so as to meet at a common point and so as to be in direct abutment with one another, it may be found desirable to space the sections slightly from one another to make a more decided line of demarcation between the printed areas on the trial piece of printing paper. The several sections can be slightly spaced from one another if a more decided line of demarcation is desired between each adjacent pair thereof, but it is pointed out that the amount by which the sections can be spaced from one another is limited by the purpose of the described arrangement, namely, that the spacing between the adjacent sections should not be so great as to prevent a portion of each of the sections extending into a given substantially restricted area on the tablets, which area is adapted to cover a given center of interest on the negative being printed.

Although I have shown and described a specific embodiment of my invention, I am fully aware that many modifications thereof are possible. My invention, therefore, is not to be restricted except in so far as is necessitated by the prior art and by the spirit of the appended claims.

Having thus described my invention what I claim as new and desire to secure by Letters Patent of the United States is:

1. An exposure tablet of the type and for the purpose described comprising a flexible transparent support having a plurality of sector-shaped sections of varying transparency, the density of each of said sections being different and being such as to pass only a given fraction of the total light of a beam projected thereon, whereby an exposure made through each section is adapted to be a fraction of a given exposure, each of said sections bearing an index giving a direct reading of the time of exposure made through said section, each of said indicia having a different density than the section immediately surrounding it, and said sections arranged on said support so that they extend radially from a common point and are substantially in abutting relation to form a circle, whereby the image of a given restricted portion of a negative is adapted to be projected through all of said sections simultaneously and said support extending beyond the edges of said circle to provide a part adapted to be grasped by the hand for manipulating said circle to include a given restricted portion of the projected image.

2. An exposure tablet of the type and for the purpose set forth comprising a substantially rectangular support of flexible sheeting adapted to be placed directly in surface contact with a sheet of printing paper onto which a negative is to be printed, and having a plurality of sector-shaped sections each of different transparency and arranged in a circle on said support with their vertices emanating substantially from a common point and with their straight edges substantially in abutting relation whereby the image of a given restricted portion of the negative is adapted to be projected through all of said sections simultaneously and onto the printing paper, the density of each of said sections being such as to pass only a given fraction of the total light of a beam directed therethrough, whereby an exposure made through each section onto the printing paper is adapted to be a fraction of a given exposure made through them all simultaneously, said sections arranged relative to one another so that the density of the scale increases successively in one direction around the circle, whereby a processed print of the exposures made through the several sections simultaneously is adapted to indicate whether printing paper of the correct contrast is being used, and said circular scale being smaller than said support and located thereon so as to leave an unused portion at one edge by which the support can be handled to locate the scale on the printing paper in the desired position relative to the projected image of the negative.

JOHN WARREN GILLON.